(12) United States Patent
Robertson et al.

(10) Patent No.: US 6,368,714 B1
(45) Date of Patent: *Apr. 9, 2002

(54) MOISTURE-ACTIVATED ADHESIVE COMPOSITIONS

(76) Inventors: John Russell Robertson, 59 Paul La., Glen Mills, PA (US) 19342; James Anthony Yavorsky, 391 Megan Dr., Mickleton, NJ (US) 08056

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/319,197

(22) Filed: Oct. 6, 1994

Related U.S. Application Data

(63) Continuation-in-part of application No. 08/136,359, filed on Oct. 14, 1993, now abandoned.

(51) Int. Cl.[7] .............................................. B32B 27/00
(52) U.S. Cl. ................... 428/425.1; 156/331.4; 528/77; 528/78
(58) Field of Search ................... 156/331.4; 428/425.1; 528/77, 78

(56) References Cited

U.S. PATENT DOCUMENTS

| | | | | |
|---|---|---|---|---|
| 3,042,631 A | * | 7/1962 | Strandskov | 528/78 |
| 3,105,063 A | * | 9/1963 | Damusis | 528/78 |
| 3,248,371 A | * | 4/1966 | Damusis | 528/78 |
| 3,792,023 A | | 2/1974 | Havenith et al. | |
| 3,919,173 A | * | 11/1975 | Coyner et al. | 528/76 |
| 3,968,089 A | * | 7/1976 | Cuscurida et al. | 528/59 |
| 4,032,686 A | * | 6/1977 | Emmons | 528/59 |
| 4,171,419 A | * | 10/1979 | Meyer et al. | 528/78 |
| 4,273,910 A | * | 6/1981 | Lederer | 528/77 |
| 4,322,327 A | * | 3/1982 | Yoshimura et al. | 528/59 |
| 4,412,033 A | * | 10/1983 | LaBelle et al. | 528/60 |
| 4,448,907 A | * | 5/1984 | Schafer | 528/78 |
| 4,661,542 A | * | 4/1987 | Gilch et al. | 528/76 |
| 4,780,520 A | * | 10/1988 | Rizk et al. | 528/53 |
| 4,876,308 A | * | 10/1989 | Melby et al. | 528/66 |
| 5,143,995 A | * | 9/1992 | Meckel et al. | 528/76 |
| 5,155,180 A | * | 10/1992 | Takada et al. | 528/66 |
| 5,162,481 A | * | 11/1992 | Reid et al. | 528/60 |
| 5,173,538 A | * | 12/1992 | Gilch et al. | 528/60 |
| 5,179,143 A | | 1/1993 | Konig et al. | |
| 5,264,515 A | * | 11/1993 | Cody et al. | 528/59 |
| 5,288,797 A | * | 2/1994 | Khalil et al. | 528/59 |
| 5,290,853 A | * | 3/1994 | Regan et al. | 528/71 |
| 5,407,968 A | * | 4/1995 | Sano | 528/77 |

FOREIGN PATENT DOCUMENTS

| | | | | |
|---|---|---|---|---|
| EP | 0012927 | | 7/1980 | |
| EP | 0527568 | | 2/1993 | |
| GB | 1033928 | * | 6/1966 | 528/77 |
| JP | 62-184008 | * | 8/1987 | 528/77 |

* cited by examiner

*Primary Examiner*—John J. Gallagher
(74) *Attorney, Agent, or Firm*—Kevin J. Boland

(57) ABSTRACT

Moisture-activated adhesive compositions are provided which comprise the reaction product of (a) a polyisocyanate and (b) an isocyanate-reactive component comprising an aliphatic tertiary amine-initiated polyol having an ethylene oxide content of at least 1%. Methods for bonding substrates with the present adhesive compositions are also disclosed.

23 Claims, No Drawings

MOISTURE-ACTIVATED ADHESIVE COMPOSITIONS

CROSS REFERENCE TO RELATED APPLICATIONS

The present application is a continuation-in-part of U.S. patent application Ser. No. 08/136,359, filed Oct. 14, 1993, entitled "Moisture-Activated Adhesive Compositions", now abandoned.

FIELD OF THE INVENTION

The present invention is directed to moisture-activated adhesive compositions and methods for their production and use. More specifically, the present invention is directed to moisture-activated adhesive compositions which are cold curable.

BACKGROUND OF THE INVENTION

Adhesives suitable for use in wood products which demonstrate a prolonged pot life and a fast cure rate have long been desirable. Such adhesives would be useful in the manufacture of plywood, chip board, fiberboard, etc. However, these characteristics have proven to be difficult to obtain in simple formulations.

The plywood industry also has a need for adhesives which can effectively bond lignocellulosic solutions having a relatively high moisture content to effectively produce laminated veneers. For example, it would be desirable for adhesives used in these industries to be able to bond substrates having a moisture content of, e.g., 10% to 20%. Most conventional adhesives, such as those of the phenol-formaldehyde type, require a moisture content below 7%.

Examples of such phenol-formaldehyde type resins are disclosed, e.g., in *Plywood and Adhesive Technology*, Sellers, Jr., Marcel Dekker, Inc. (1985). These resins provide excellent adhesion, but are disadvantageous in that they require heat activation and a considerable amount of time to cure. Moreover, as noted above, such resins cannot be used effectively with substrates having high moisture levels. Thus, the substrates must be dried to a relatively low moisture content (generally about 5% by weight) resulting in a loss of wood volume and an increase in the cost and time of production.

Isocyanate-based adhesives are also known and have been employed in the preparation of laminated wood and paper structures. Polyisocyanates have been used as adhesives in the formation of waferboard, fiberboard and paper laminates from cellulose and lignocellulosic materials. An example of an isocyanate based adhesive is set forth in U.S. Pat. No. 4,414,361 which discloses polyisocyanate-cyclic alkaline carbonate binder compositions and their use in the preparation of lignocellulosic composite molded products. This patent discloses the addition of the adhesive to lignocellulosic material and molding this mixture at temperatures of from about 140° C. to 220° C. These polyisocyanates require temperatures of up to 200° C. or more for curing in order to develop acceptable physical bonding strengths. The use of such extreme temperatures reduces wood volume and is often not desirable from a cost or processing standpoint.

Accordingly, it can be seen that there is a need for one component adhesive compositions useful in the preparation of lumber replacements, such as laminated veneer lumber, which fully cure at relatively low temperatures, e.g., room temperature. There is also a need for such adhesives which have a prolonged pot life suitable for use in commercial production methods. Moreover, there is a need for processes for preparing composite products with cellulosic and lignocellulosic materials using such adhesives.

SUMMARY OF THE INVENTION

These objectives are obtained by the present adhesive compositions which demonstrate excellent adhesive properties with a prolonged pot life and fast cure, particularly at room temperature. The present compositions are activated by the moisture present in the substrate with which they are being used and thus, they may be most effectively used with substrates having a relatively high moisture content, such as 7% or more. Accordingly, the present compositions are effectively used with various types of lignocellulosic materials and are particularly useful in the preparation of lumber replacements as discussed above. The present adhesive compositions have a further advantage over prior art systems in that they are cold curable, i.e., may be cured at room temperature, or by the application of heat.

The present invention is directed to moisture-activated adhesive compositions comprising the reaction product of (a) a polyisocyanate and (b) an isocyanate-reactive component comprising at least one aliphatic tertiary amine-initiated polyol having an ethylene oxide content of at least 1%. The present invention is further directed to a process for bonding multiple substrates comprising: (1) applying to a surface of at least one substrate a moisture-activated adhesive composition comprising the reaction product of (a) a polyisocyanate and (b) an isocyanate-reactive component comprising at least one aliphatic tertiary amine-initiated polyol having an ethylene oxide content of at least 1%; (2) contacting this surface of the substrate with a surface of a second substrate; (3) applying pressure to the contacted surfaces; and (4) curing the adhesive composition.

DETAILED DESCRIPTION OF THE INVENTION

The present adhesive compositions comprise about 99 to about 70%, preferably about 93 to about 80% and most preferably about 90 to about 80% by weight of the polyisocyanate component.

Polyisocyanates useful in the present invention are those having a number-average isocyanate functionality greater than 2.0, preferably greater than 2.1, more preferably greater than 2.3 and most preferably greater than 2.5. Useful polyisocyanates should have a number average molecular weight of from about 100 to about 5000 and preferably about 120 to about 1800. Preferably, at least 50 mole percent and preferably at least 90 mole percent of the isocyanate groups are bonded directly to aromatic groups.

Suitable aromatic polyisocyanates include, e.g., p-phenylene diisocyanate; m-phenylene diisocyanate; 2,4-toluene diisocyanate; 2,6-toluene diisocyanate; naphthalene diisocyanate; dianisidine diisocyanate; polymethylene polyphenyl polyisocyanate; 2,4'-diphenyl methane diisocyanate (2,4'-MDI) ; 4,4'-diphenylmethane diisocyanate (4,4'-MDI); 3,3'-dimethyl-4,4'-biphenylene diisocyanate; poly-diphenylmethane polyisocyanate having a functionality of greater than 2; and mixtures thereof. The polyisocyanates should have a 2,4'-MDI content of less than 18.0%, preferably less than 10% and most preferably less than 5%. The MDI isomers, mixtures of these isomers with polydiphenylmethane polyisocyanates, polydiphenylmethane itself and derivatives thereof are preferred.

The polyisocyanate may include minor amounts of aliphatic polyisocyanates. Suitable aliphatic polyisocyanates include isophorone diisocyanate; 1,6-hexamethylene diisocyanate; 1,4-cyclohexyl diisocyanate; saturated analogues of the above-mentioned aromatic polyisocyanates and mixtures thereof.

The polyisocyanate component of the present composition is preferably a polymeric polyisocyanate, and more preferably a polymeric diphenylmethane diisocyanate. Commercially available polymeric polyisocyanates include Rubiflex® 26A available from ICI Americas Inc., Wilmington, Del.

Isocyanate-terminated prepolymers may also be employed in the present invention. As used herein, the term "isocyanate-terminated prepolymer" includes the prepolymer as well as the pseudoprepolymer, i.e., a mixture of the prepolymer and the polyisocyanate from which the prepolymer is prepared. The isocyanate-terminated prepolymer useful in the present compositions should have a free isocyanate (NCO) content of from about 10 to about 26%, preferably about 16 to about 26%. In general, the polymeric polyisocyanate may be prepared by the reaction of an excess of a polyisocyanate and a polyol, including aminated polyols or imino/enamines thereof.

Suitable polyols for preparing the isocyanate-terminated prepolymers include:
  (a) polyether polyols, thioether polyols and/or hydrocarbon-based polyols having a molecular weight of from about 1000 to 3000 and an average hydroxyl functionality of from about 1.9 to 4;
  (b) polyester polyols having a molecular weight of 1000 or more and an average hydroxyl functionality of from about 1.9 to 4.

A particularly preferred isocyanate-terminated prepolymer useful in the present invention are MDI prepolymers which are the reaction product of an excess of polymeric MDI and polyether polyols. The polyether polyols are preferably diols or triols having hydroxy values of 25 to 120. The polyol should have a number average molecular weight in the range of about 1000 to 3000. Such prepolymers should generally have a free-NCO content of more than about 10%, preferably more than about 16% and most preferably about 16 to about 26%. Suitable polymers are those in which the stoichiometric ratio of isocyanate (NCO) to hydroxyl (OH) exceeds 1:1. Rubinate® M available from ICI Americas is a suitable polymeric MDI composition useful in the present invention.

Most preferably, the polyisocyanate component is a blend of polymeric MDI, such as the aforementioned Rubinate®M and pure MDI. Such blends have been found to provide improved penetration into the lignocellulosic substrate and higher wood failure as opposed to glueline failure. A commercially available pure MDI product suitable for use in the present invention is Rubinate® available from ICI Americas Inc. These blends contain polymeric MDI to pure MDI in ratios of about 95:5 to 50:50 and preferably 60:40 to 80:20.

The second component of the present compositions is an isocyanate-reactive component comprising at least one aliphatic tertiary amine-initiated polyol having an ethylene oxide content of at least 1%. Preferably, the ethylene oxide content is from about 1 to about 90%, preferably about 5 to about 60% and most preferably about 10 to about 40%. The aliphatic tertiary amine-initiated polyol provides an ethylene oxide content in the prepolymer of about 0.01 to about 27%, preferably about 0.35 to about 12% and most preferably about 1 to about 8%. This amount of ethylene oxide is the total amount in the prepolymer. It has been found that the polyol may contain any amount of propylene oxide.

Suitable aliphatic tertiary amine-initiated polyols are the known alkoxylation products of amines or aminoalcohols with at least two active hydrogen atoms with ethylene oxide and/or propylene oxide. Suitable initiator molecules include: ammonia, ethylene diamine, hexamethylene diamine, methyl amine, diaminodiphenyl methane, aniline, ethanolamine, diethanolamine, N-methyl diethanolamine, tetrahydroxyl ethyl ethylenediamine, etc.

Suitable aliphatic tertiary amine-initiated polyols are those wherein the initiator comprises about 1 to about 18 and preferably about 1 to about 6 carbon atoms. Suitable aliphatic tertiary amine-initiated polyols have an average molecular weight of about 1500 to about 10,000 and preferably 1500 to about 6000 and an average OH functionality of about 1.8 to about 6.0.

The present inventors have found that the concentration of nitrogen in the amine-initiated polyol is related to the effectiveness, i.e., fast cure rate, of the composition. In general, the nitrogen concentration should be about 0.002 to about 0.02 eqN/100 g, preferably about 0.004 to about 0.008 eqN/100 g and most preferably about 0.006 eqN/100 g.

Preferred amine-initiated polyols for use in the present invention include those prepared from ethylene diamine, triethylene tetramine and triethanolamine.

The present compositions comprise component (b), the aliphatic tertiary amine-initiated polyol component, in an amount of about 1 to about 30%, preferably about 7 to about 20% and most preferably about 10 to about 20% by weight based upon the total amount of isocyanate and polyol in the composition.

In its most preferred form, the amine-initiated polyol is an ethylene diamine-based polyol containing ethylene oxide. Suitable ethylene diamine-based polyols are those having an ethylene oxide content of about 1 to about 90%, preferably about 5 to about 60%, and most preferably about 10 to about 40%. The ethylene oxide content refers to the amount of ethylene oxide utilized in the preparation of the polyols as discussed above. During production, the ethylene oxide reacts with the initiator. The polyols should have a molecular weight in the range of 1500 to 5000.

Suitable ethylene diamine-based polyols useful in the present compositions include those of the following formula:

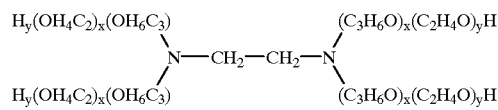

wherein x is an integer of about 1.0 to about 29.0, preferably about 4.0 to about 20 and most preferably about 4.0 to about 14; and y is an integer of about 0.1 to about 10.0 and preferably about 2.0 to about 4.0. Suitable ethylene diamine-based polyols are available commercially, such as the "Synperonic T" series of polyols available from ICI Americas Inc.

Although not wishing to be limited to a single theory, it is believed that the amine-initiated polyol remains inactive in the present adhesive composition until it comes into contact with the moisture in the wood. Once the amine initiated polyol contacts the moisture, it is believed to promote the reaction between the polyisocyanate and water in the system, thus accelerating adhesion. The result is that the present adhesives are relatively fast curing. Moreover, the adhesive remains on the surface of the wood where it is most effective and can develop the cold tack necessary for processing.

The present compositions may further comprise various compounds having a catalytic function to improve the cure rate of the system. Examples of appropriate catalysts are, e.g., the tertiary amine catalysts. Suitable tertiary amine catalysts are available commercially as Niax A-4 available from Union Carbide and Thancat DMDEE is available from Texaco. Most preferably, the Niax A-4 catalyst is used in the relatively slower cure systems.

When used in the present adhesive compositions, the catalysts are contained in an amount of from about 0.1 to about 2.0% parts by weight and preferably about 0.25 to about 1.0 parts by weight based on the weight of total amount of polyurethane in the compositions.

The present adhesive compositions may be prepared by simply mixing or blending the polyisocyanate component and the polyol component under suitable conditions, particularly if both components are liquids. No moisture should be allowed to enter the system. If one of the components is a solid, that component should be fully dissolved in the other liquid component. In any event, the components may be mixed or blended by any means evident to one skilled in the art from the present disclosure.

Conventional fillers, such as calcium carbonate, and clays are generally added to the composition. Fillers have been found useful to hold the adhesive on the surface of the substrate to be treated. Also, it may be necessary to utilize diluents and/or wetting agents to modify the viscosity of the composition. These materials are used in amounts appropriate for specific applications which will be evident to one skilled in the art based on the present disclosure.

The adhesive compositions of the present invention have been found to have a pot life of approximately one month or more under moisture-free conditions when mixed prior to application to a substrate.

The present compositions are also "cold curable", i.e., may be cured at a temperature of about 10° C. to about room temperature although they can also be hot cured. Thus, the present compositions may be cured at temperatures of from about 10° C. to about 250° C. Preferably the present compositions are cured at a temperature of about 23° C. to about 125° C. Generally, most systems will cure at room temperature in about 10–60 minutes.

The adhesive compositions of the present invention may be used to bond many different types of moisture-containing substrates. Preferably the present compositions are used to bond multiple wood substrates together to prepare engineering lumber products. It is preferred that at least one of the substrates be selected from the group consisting of wood, paper, rice hulls, cement, stone, cloth, grass, corn husks, bagasse, nut shells, polymeric foam films and sheets, polymeric foams and fibrous materials. Preferably, the present composition is used to fabricate multi-substrate composites or laminates, particularly those comprising lignocellulosic or cellulosic materials, such as wood or paper, to prepare products such as plywood, laminated veneer lumber, waferboard, particleboard, fiberboard, chipboard, and oriented wood products, such as "Parallam", available from McMillan Bloedell.

As the present adhesive compositions are moisture-activated, it is important that the substrates have a relatively high moisture content. Specifically, the substrates should have a moisture content of at least about 7%. Preferably, the substrates have a moisture content of about 10 to 20% by weight and more preferably about 12 to 15% by weight.

When used to bond multiple substrates together, the present composition is applied to a surface of a first substrate. A surface of a second substrate is then contacted with the surface of the first substrate containing the present composition. Pressure is then applied to the contacted surfaces and the adhesive compositions are allowed to cure. The surface of the second substrate against which the first substrate is contacted is generally not coated with the present adhesive composition. However, that surface may also be coated prior to contacting the substrates.

The present adhesive compositions may also be formulated to provide cold tack immediately after application to a substrate. This is particularly useful for pre-press operations where mechanical handling is often necessary. Cold tack may be accomplished by inclusion of about 10–20% of a faster acting ethylene-diamine-based polyol in the formulation. Generally, those polyols having a relatively high ethylene oxide content, i.e., greater than 25%, are considered to be faster acting.

The present adhesive compositions may be applied to the surfaces of the substrates in any conventional manner. For example, the surface may be coated with the composition by spraying, brushing, etc. Suitable means for applying the adhesive compositions to the surface of the substrate for a particular application will be evident to one skilled in the art from the present disclosure.

After the coated substrates are contacted with each other, pressure is applied thereto. The pressure should be sufficient to cause the surfaces to adhere to one another. Generally, the amount of pressure and the time period for which the pressure is applied are not limited and specific pressures and times will be evident to one skilled in the art from the present disclosure. However, it has been found preferable that a pressure of approximately 10 to 200 psi be applied for about 10 to about 20 minutes to cause appropriate adhesion for most substrates. Further processing can generally be conducted on the treated substrates in about one hour.

The invention is now illustrated by the following examples which are not intended to limit the scope of the invention.

EXAMPLES

The following adhesive compositions were prepared in accordance with the present invention.

Example 1

| Formulation A | Parts By Weight |
| --- | --- |
| MDI prepolymer | 25.0 |
| Polyol 1 | 10.0 |
| Thancat DMDEE | 0.1 |
| Calcium Carbonate No. 7 | 10.0 |
| Benzaldehyde | 0.5 |

The MDI prepolymer had an NCO content of 24.5% and was prepared by reacting Rubinol F-456 (a polyether diol available from ICI Americas Inc.) with an 80/20 blend of polymeric MDI to pure MDI. The standard polymeric MDI used was Rubinate M™ and the pure MDI used was Rubinate 44™, both available from ICI Americas Inc. Polyol 1 was "Synperonic T 701" which is an ethylene diamine—based polyol available from ICI Americas Inc.

Formulation A was prepared by blending the components at room temperature in a standard mix cup and stirring by hand.

Southern pine veneers were conditioned to a moisture content of 14.0% in a humid aging cabinet at 95% relative humidity and 95° F. Formulation A was then applied by brush to one side of two separate veneers at a coating weight of 12.0 g/sq.ft. The coated veneers were then brought into contact and pressed for 20 minutes at room temperature and a pressure of 150 psi.

The prepared veneers were tested for glueline formulation according to APA (American Plywood Association) guidelines for exterior type testing. Specifically, each sample veneer was tested for accelerated aging shear. Each sample was boiled for 4 hours and then dried for 20 hours at 145° F. (±5° F.). After drying, the samples were boiled again for 4 hours and cooled in water.

Each sample was then sheared by placing it in a pressure vessel and submerging the entire vessel in cold tap water. A vacuum of 25 inches of mercury was then drawn and maintained for 30 minutes, followed immediately by the application of 65–70 pounds per square inch of pressure for 30 minutes. The samples were then removed from the vessel and tested while wet by tension loading to failure in a shear testing machine. The percentage of wood failure occurring on the sheared surfaces was then estimated for each sample.

The Sample prepared with Formulation A showed a wood failure of greater than 85% at a shear load of 99.0 psi.

| Formulation B | Parts By Weight |
| --- | --- |
| MDI prepolymer | 25.0 |
| Polyol 1 | 10.0 |
| Thancat DMDEE | 0.1 |
| Calcium Carbonate No. 7 | 10.0 |

The MDI prepolymer used in Formulation B had an NCO content of 24% and was prepared by reacting Rubinol F-456 with a 60/40 blend of Rubinate M™ /Rubinate 44™.

Southern pine veneers were treated as described above with respect to Formulation A, with the exception that the veneers were conditioned to a moisture content of 10%. Formulation B was applied to one side of two separate veneers at a weight of 14 g/sq.ft. The samples were pressed for 20 minutes at room temperature and 200 psi.

The samples were tested for accelerated aging shear as described above and were found to have a wood failure of greater than 85% at a shear load 177 psi.

| Formulation C | Parts By Weight |
| --- | --- |
| MDI prepolymer | 25.0 |
| Polyol 1 | 3.25 |
| Polyol 2 | 0.75 |
| Niax A-4 | 0.25 |
| Calcium Carbonate No. 7 | 10.0 |
| SAG 47 | 0.07 |

The MDI prepolymer used in Formulation C had an NCO content of 26% and was prepared by reacting Rubinol F-456™ with Rubinate M™. Polyol 2 was "Synperonic T 304" available from ICI Americas Inc. which is also an ethylene-diamine based polyol. SAG 47 is an antifoam agent available from Union Carbide.

Southern pine veneers were conditioned to a moisture content of 10%. Formulation C was applied to one side of two separate veneers at a weight of 12 g/sq.ft. The system developed cold tack in 10 minutes.

The samples were pre-pressed cold at 150 psi for 4 minutes. The samples were then hot-pressed at a temperature of 300° F. for 3 minutes at 200 psi.

Each sample was then tested for accelerated aging shear as described above with respect to Formulation A. The samples demonstrated greater than 85% wood failure at a shear load of 92 psi.

Accordingly, it can be seen that the present adhesive compositions provide excellent adhesion as demonstrated by a high degree of wood failure in both cold and hot cure (Formulation C) systems.

Example 2

Eleven resin samples were prepared by mixing Rubinate® 1840 polymeric MDI (PMDI) with a polyol component at room temperature. All samples were prepared by simple hand mixing, although Samples 8–12 required vigorous agitation. The composition of each sample is set forth below in Table 1.

TABLE 1

| 1 | 100% PMDI (control) |
| --- | --- |
| 2 | 95% PMDI/5% Synperonic T 304 |
| 3 | 97.7% PMDI/2.26% Daltolac R-140 |
| 4 | 95.7% PMDI/2.26% Daltolac R-140/2.0% Carbowax MOPEGS |
| 5 | 99.15% PMDI/0.85% Vornol R800 |
| 6 | 97.15% PMDI/0.85% Vornol R800/2.0% Carbowax MOPEGS |
| 7 | 93% PMDI/7% Synperonic T304 |
| 8 | 95% PMDI/5% Petrolite X8117 |
| 9 | 95% PMDI/5% Petrolite X8118 |
| 10 | 95% PMDI/5% Petrolite X8119 |
| 11 | 95% PMDI/5% Petrolite X8120 |
| 12 | 95% PMDI/5% Petrolite X8121 |

Synperonic T304 is an ethylene diamine based polyol with 40% EO from ICI Americas Inc.

Daltolac R-140 is a triethanolamine-based polyol from ICI Americas Inc.

Carbowax MOPEGS is a methoxypolyethylene glycol, available from Union Carbide.

Vornol R800 is a propylene oxide adduct of EDA available from Dow.

Petrolite X-8117 is an oxylated amine having a PO/EO ratio of 80/10 available from Petrolite Corp.

Petrolite X-8118 is an oxylated amine having a PO/EO ratio of 80/30 available from Petrolite Corp.

Petrolite X-8119 is an oxylated amine having a PO/EO ratio of 105/50 available from Petrolite Corp.

Petrolite X-8120 is an oxylated amine having a PO/EO ratio of 105/80 available from Petrolite Corp.

Petrolite X-8121 is an oxylated amine having a PO/EO ratio of 105/90 available from Petrolite Corp.

Ground aspen wafers from Louisiana Pacific were mixed with each resin sample in a ratio of 2:1 wood to resin. Calorimetric measurements were then obtained in a Texas Instruments Differentiated Scanning Colorimeter (DSC) 2910. 3.0 mg samples of the resin/wood mixture were placed in the DSC sample pans and sealed. The samples were heated at a rate of 10° C. per minute at 500 psi. The peak temperature of each sample was measured. The results are set forth in Table 2 with the equivalents of nitrogen in each sample.

TABLE 2

| Sample | Equivalents of Nitrogen | Peak Temp (° C.) |
| --- | --- | --- |
| 1 | 0 | 134 |
| 2 | 0.0061 | 90 |
| 3 | 0.0061 | 131 |

TABLE 2-continued

| Sample | Equivalents of Nitrogen | Peak Temp (° C.) |
|---|---|---|
| 4 | 0.0061 | 126 |
| 5 | 0.0061 | 123 |
| 6 | 0.0061 | 122 |
| 7 | 0.0084 | 88 |
| 8 | 0.0001 | 118 |
| 9 | 0.0008 | 123 |
| 10 | 0.0006 | 124 |
| 11 | 0.0005 | 119 |
| 12 | 0.0005 | 123 |

The peak temperature indicates at what point the reaction between the resin and the wood occurs. Therefore, a lower peak temperature represents high reactivity, i.e., faster cure rate.

As can be seen in Table 2, Samples 2 and 7 have the fastest cure rates. Samples 3 and 5, which contain no ethylene oxide on the polyol, have relatively higher cure rates. Samples 4 and 6, in which the ethylene oxide has been added separately (by the addition of MOPEGS to the system) and thus also do not contain ethylene oxide on the polyol, also have higher cure rates. Samples 8–12 which have a relatively lower amount of amine in the polyol have slower cure rates than those examples having a higher amine concentration.

Accordingly, Example 2 clearly shows that the cure rate improves with an increasing concentration of amine in the polyol and with at least some ethylene oxide on the polyol.

The present invention may be embodied in other specific forms without departing from the spirit or essential attributes thereof and, accordingly, reference should be made to the appended claims, rather than to the foregoing specification as indicating the scope of the invention.

What is claimed is:

1. A moisture-activated liquid adhesive composition having a pot life of at least about one month under anhydrous conditions, comprising the reaction product of:
   (a) a polyisocyanate and
   (b) an isocyanate-reactive component comprising an amine-initiated polyol having an ethylene oxide content of at least 1%, an average molecular weight from about 1,500 to about 10,000 said polyol being represented by the following formula (1)

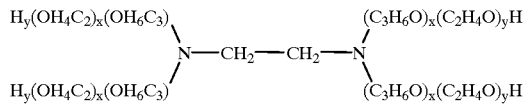

wherein each x independently represents an integer of 1 to 29.0 and each y is 0.1 to 10.

2. A moisture-activated adhesive composition as in claim 1, further comprising a catalyst.

3. A moisture-activated adhesive composition as in claim 1, wherein said polyisocyanate is a polymeric polyisocyanate.

4. A moisture-activated adhesive composition as in claim 3, wherein said polymeric polyisocyanate is a polymeric diphenylmethane diisocyanate.

5. A moisture-activated adhesive composition as in claim 1, wherein said polyisocyanate is an isocyanate-terminated prepolymer having an NCO content of 10 to 26%.

6. A moisture-activated adhesive composition as in claim 5, wherein said polyisocyanate is the reaction product of polymeric diphenylmethane diisocyanate and a polyether polyol having a molecular weight of from about 1000 to about 3000.

7. A moisture-activated adhesive composition as in claim 1, wherein said polyisocyanate is a blend of polymeric diphenylmethane diisocyanate and pure diphenylmethane diisocyanate.

8. A moisture-activated adhesive composition as in claim 1, wherein said amine-initiated polyol has an ethylene oxide content of 1 to 90%.

9. A moisture-activated adhesive composition as in claim 8, wherein said amine-initiated polyol has an ethylene oxide content of 5 to 60%.

10. A moisture-activated adhesive composition as in claim 1, wherein said amine-initiated polyol has a molecular weight of 1500 to 10,000 and comprises an initiator having 1 to 18 carbon atoms.

11. A moisture-activated adhesive composition as in claim 1, wherein the concentration of nitrogen in the aliphatic tertiary amine-initiated polyol is 0.002 to 0.02 eqN/100 g.

12. A moisture-activated adhesive composition as in claim 1, wherein said amine-initiated polyol is prepared from a compound selected from the group consisting of ethylene diamine, triethylene tetramine and triethanolamine.

13. A moisture-activated adhesive composition as in claim 2, wherein said catalyst is a tertiary amine catalyst.

14. A moisture-activated adhesive composition as in claim 1, comprising 99 to 70% of said plyisocyanate and 1 to 30% by wt of said isocyanate-reactive component.

15. A moisture-activated adhesive composition as in claim 1, wherein said aliphatic tertiary amine-initiated polyol has an average molecular weight of from about 1,500 to about 6,000.

16. A moisture-activated adhesive composition as in claim 1, wherein said amine-initiated polyol has an average OH functionality of about 1.8 to about 6.0.

17. A moisture-activated liquid adhesive composition having a pot life of at least about one month under moisture free conditions comprising the reaction product of:
   (a) a polyisocyanate and
   (b) an isocyanate-reactive component comprising an amine-initiated polyol having an ethylene oxide content of at least 1% and an average molecular weight of between about 1,500 and about 10,000, the amine being selected from the group consisting of triethylene tetramine and triethanolamine.

18. A moisture-activated adhesive composition as in claim 17, wherein said amine-initiated polyol has an average molecular weight of from about 1,500 to about 6,000.

19. A moisture-activated adhesive composition as in claim 17, wherein said amine-initiated polyol has an average OH functionality of about 1.8 to about 6.0.

20. A process for bonding multiple lignocellulosic or cellulosic substrates having a moisture content of at least about 7% comprising (1) applying to a surface of a first substrate a moisture-activated adhesive composition as claimed in claim 1; (2) contacting said surface with a surface of a second substrate; (3) applying pressure to the contacted surfaces; and (4) curing said adhesive composition.

21. A process for bonding multiple lignocellulosic or cellulosic substrates comprising (1) applying to a surface of a first substrate a moisture-activated adhesive composition as claimed in claim 17; (2) contacting said surface with a surface of a second substrate; (3) applying pressure to the contacted surfaces; and (4) curing said adhesive composition.

22. A composite article comprising a first substrate and a second substrate bonded with an adhesive composition as claimed in claim 1.

23. A composite article comprising a first substrate and a second substrate bonded with an adhesive composition as claimed in claim 17.

* * * * *